Nov. 29, 1938.   W. C. WEBER ET AL   2,138,198
COFFEE MAKER
Filed Aug. 17, 1936
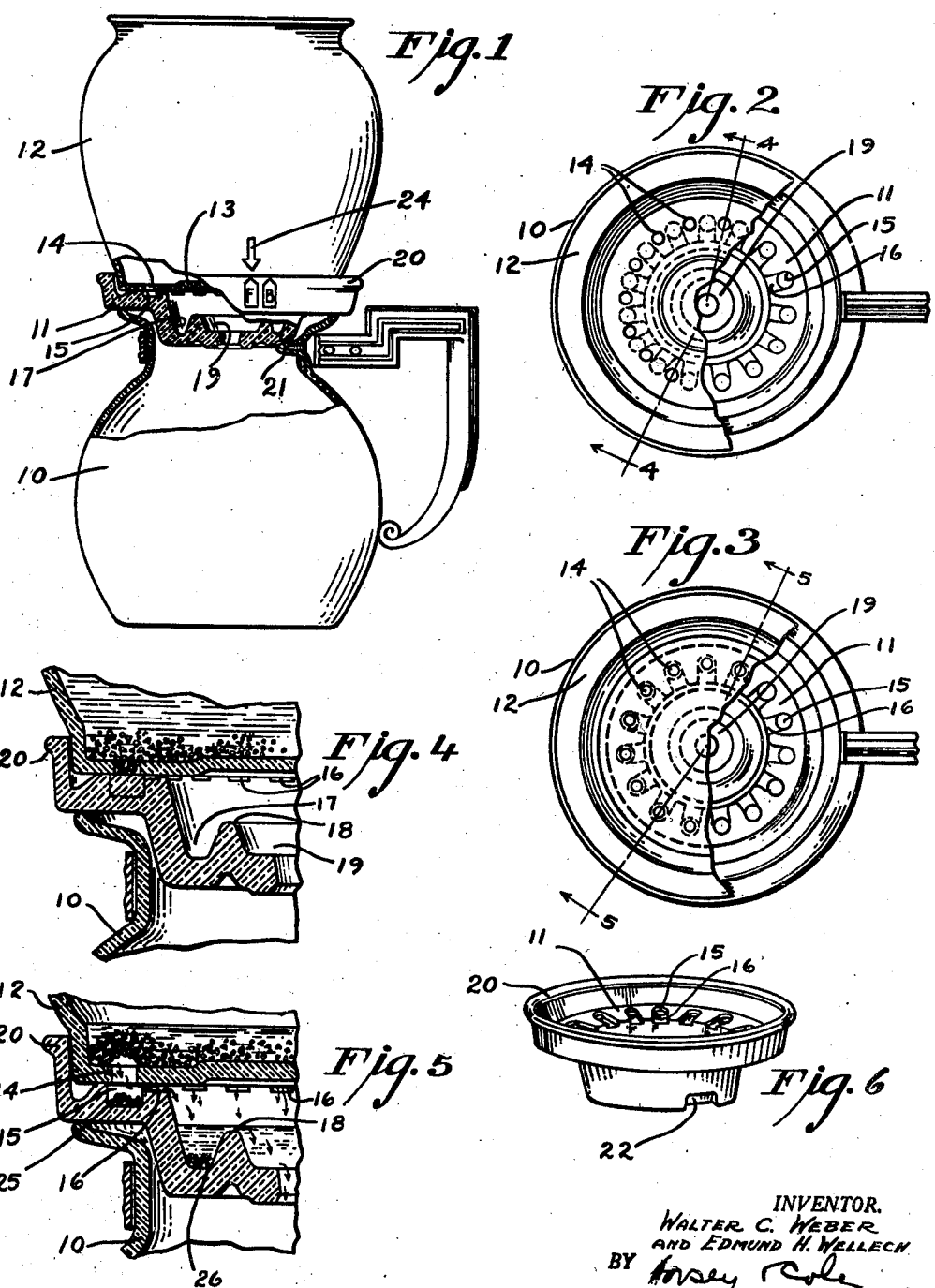
INVENTOR.
WALTER C. WEBER
AND EDMUND H. WELLECH
BY
ATTORNEYS.

Patented Nov. 29, 1938

2,138,198

UNITED STATES PATENT OFFICE 2,138,198

COFFEE MAKER

Walter C. Weber, Painted Post, and Edmund H. Wellech, Corning, N. Y., assignors to Corning Glass Works, Corning, N. Y., a corporation of New York Application August 17, 1936, Serial No. 96,530

8 Claims. (Cl. 53—3)

This invention relates to coffee makers and particularly to the type of coffee makers wherein water, which has been heated nearly to the boiling point, is passed through a confined mass of finely ground coffee and a suitable filter.

In all past coffee makers of this type with which we are familiar, the brewing and filtering action occurs concurrently, the filtering action starting substantially immediately after the water has been poured over the ground coffee. The filtering action is, accordingly, made slow so as to allow the water time to extract as much of the essence from the coffee as is practicable.

In order to obtain a brew of superior quality, free from the harmful effects of most coffee, the coffee should be permitted to brew from two to four minutes as desired in accordance with the taste of the user, after which the brew should be filtered as completely and as quickly as possible. So far as we are aware, however, no coffee brewing apparatus heretofore devised has allowed the user to exercise his own discretion as to the brewing time prior to the commencement of the filtering action.

An object of this invention is the brewing of a beverage in a manner to obtain a brew of superior quality and flavor.

Another object is a coffee maker which permits the user to exercise his own discretion as to the brewing time.

Among its features this invention embodies a coffee maker in which the brewing and filtering action can be made to occur consecutively.

Another feature is a coffee maker of simple construction, and in which all of the parts which contact with the ground coffee and the brew are formed of glass so as to avoid contamination of the brew and to preserve its quality and flavor.

A further feature is a coffee maker composed of an upper or brewing chamber, a combined valve and filter plate supporting the upper chamber, and a brew receiving vessel on which the combined valve and filter plate rests.

In the drawing:

Fig. 1 is a side elevation, partly in section, of a coffee maker embodying my invention;

Fig. 2 is a plan view of Fig. 1 with the brewing chamber arranged in the brewing position and partly broken away to better show the respective parts;

Fig. 3 is a view similar to Fig. 2, but with the parts in the filtering position;

Fig. 4 is an enlarged fragmentary view taken on the lines 4—4 of Fig. 2;

Fig. 5 is a view similar to Fig. 4, taken on line 5—5 of Fig. 3 showing the parts in filtering position; and Fig. 6 is a perspective view of the combined valve and filter plate.

Referring to the drawing, it will be seen that our coffee maker comprises a suitable vessel such as 10 for receiving the brew, a combined valve and filter plate supported by the vessel 10 and having a seat 11 on which a brewing chamber 12 rests.

The brewing chamber 12 has the central portion 13 of its bottom raised so as to direct the flow of fluid through a series of surrounding holes 14 therein, which are adapted to at times register with indentations 15 in the combined valve and filter plate seat 11 as illustrated in Figs. 1, 3 and 5. Each of the indentations 15 has connected with it a shallow channel 16 directed into a large annular sediment trough 17 the inner wall of which serves as a dam 18 over which accumulated fluid flows into the vessel 10 through a funnel-like opening 19.

The brew chamber 12 is aligned concentrically with seat 11 by an upstanding flange 20 extending from the outer periphery of the filter plate seat 11; and that bottom surface of brew chamber 12 which rests on seat 11 is ground against the seat to produce a fluid tight fit between it and the surfaces surrounding holes 14 to prevent the passage of fluid from the brew chamber 12 when the chamber is so positioned that the holes therein are out of register with indentations 15, as illustrated in Figs. 2 and 4. Such a condition prevails when an arrow 24 (Fig. 1) on the side of chamber 12 is immediately above an arrow designated "B" on the outer vertical surface of flange 20 and is termed the brewing position.

By rotating the chamber 12 slightly clockwise until the arrow 24 is immediately above an arrow designated "F" on the flange 20, the holes 14 are brought into register with the indentations 15 and this is termed the filtering position.

A nib 21 (Fig. 1), protruding from the inner wall of vessel 10, registers with a suitable notch 22 (Fig. 6) in the lower edge of the combined valve and filter plate and so prevents rotation of the plate when the brewing chamber is being rotated from its brewing to its filtering position. The vessel 10 has been illustrated as being of the same type as that shown in the co-pending said application Ser. No. 89,183, filed July 6, 1936, but it should be understood that any vessel of proper size may be used if desired and the filter plate manually held while the brew chamber is being rotated from the brewing to the filtering position.

In the operation of the coffee maker, the brew chamber is placed in the brewing position as first described, a suitable quantity of ground coffee placed therein, and water heated to a temperature near its boiling point poured thereover. The water is allowed to stand in the upper container in contact with the ground coffee and brew for the desired period of time after which the brew chamber is rotated to the second described or filtering position. It is to be understood that during the brewing period the water and ground coffee may be stirred as frequently as desired at the discretion of the user, and further, that the filtering period may be lengthened if desired by rotating the brew chamber to an intermediate point between the brewing and filtering positions.

At the first passage of fluid through the holes 14, grounds 25 (Fig. 5) which have rested in the holes will pass to the bottom of the indentations 15 now below them. However, the grounds directly above the holes form arches or domes, as indicated in Fig. 5, which prevent further passage of coffee grounds through holes 14, and the layer of grounds above such domes acts as a filter for the liquid. To eliminate the small particles of grounds 26 that have left the holes 14 and passed through the shallow channels 16 at the beginning of the flow, the liquid is allowed to first accumulate in the annular sediment trough 17 and settle, after which it flows over the wall or dam 18 and through hole 19 into the vessel 10.

When filtering action has been completed, the combined valve and filter plate and the brew chamber are removed from the vessel.

It will be seen that a coffee maker such as we have described is ideally suited to the brewing of coffee in what is believed to be the preferred manner, and is of simple construction requiring few steps in its manufacture.

Although we have shown and described but one embodiment of our invention, it is to be understood that we do not wish to be restricted thereto except as defined by the appended claims.

What we claim is:

1. In a coffee making apparatus, a brewing chamber for receiving a quantity of ground coffee and hot water, a receiving vessel for the brew, a combined valve and filter plate intermediate to said chamber and vessel initially preventing the passage of fluid through holes in the bottom of said chamber into said receiving vessel, said plate having a plurality of restricted fluid passageways therein brought into alignment with such holes by slight movement of said brewing chamber with respect to said plate, and a trough into which the flow of fluid entering said passageways is directed and one wall of which forms an overflow outlet into said receiving vessel.

2. In an apparatus for making drip coffee, a brewing chamber, said element having holes thru the bottom thereof of a greater diameter than the cross-section of individual granules of ground coffee used; and a cooperating element, on which said brew chamber rests, having surfaces cooperating with bottom surfaces of said brewing chamber for preventing the passage of fluid or ground coffee thru said holes, said element also having indentations therein each for receiving such coffee grounds as may pass thru one of such holes with which it may be brought into register and each indentation having a comparatively shallow channel connecting it with a trough in constant communication with a bottom outlet in said element arranged over a vessel for receiving the brew.

3. In a coffee brewing apparatus, a combined valve and filter plate consisting of a glass element having indentations and a sediment trough therein and also having channels connecting such indentations with the sediment trough one wall of which is also the wall of an outlet for accumulations of fluid in the trough and a brewing chamber supported by said plate having holes passing thru the bottom thereof arranged for placement in and out of register with such indentations.

4. In a coffee maker, a glass brewing chamber having an annular series of holes passing thru the bottom thereof, a glass support for said chamber adapted for placement on a vessel for receiving a brew released from confinement in said brewing chamber, said support having its chamber supporting surfaces ground against those bottom surfaces of said brewing chamber surrounding said holes and sealing them against the passage of fluid and having a series of horizontally disposed channels with which the holes may be aligned by a slight rotary movement of the brewing chamber with respect to said support.

5. A coffee brewer which consists of a brewing chamber having a perforated bottom, a support for said chamber adapted for placement over a vessel for receiving the brew, said support having horizontally disposed channels for directing fluid released from said chamber into such vessel, said brewing chamber and support having cooperating surfaces which when arranged in one manner with respect to each other seal the perforations against the passage of fluid into such channels and when shifted to an alternative position with respect to one another bring the perforations into register with such channels.

6. In a coffee making apparatus, a brewing chamber for receiving a brewing mixture having an annular series of perforations thru the bottom thereof, a chamber supporting plate having a central aperture, an annular series of indentations and channels establishing communication between the indentations and the aperture, the supporting surface of the plate cooperating with the bottom surface of said brewing chamber to close the open sides of the channels and produce restricted passageways, and the walls of the indentations cooperating with the walls of the apertures to control the flow of fluid thru the channels.

7. An apparatus employed in brewing a beverage by allowing a mixture of fluid and dry ingredients to brew for a selectel period of time and then filtering the brew from the dregs, consisting of a brewing chamber for receiving the mixture having an annularly arranged series of perforations thru the bottom thereof; in combination with a supporting plate having an annular row of indentations adapted to register with the perforations in the chamber, the surfaces of the plate surrounding the indentations cooperating with the bottom surfaces of said brewing chamber to prevent the passage of fluid from said chamber, said plate having an aperture therethru and having indentations and channels in its supporting surface in communication with each other, said indentations being so spaced that the perforations may be brought into register therewith to provide a path for the flow of fluid through the channels.

8. In an apparatus for making drip coffee, a brewing chamber having a perforated bottom, a plate upon which said chamber rests in rotatable relation with respect to said plate, said plate having surfaces which are cooperative with the adjacent bottom surfaces of the brewing chamber surrounding the perforations to seal them against the flow of fluid therefrom, said plate also having channels cooperative with bottom surfaces of said brewing chamber and terminating in indentations alternately disposed with respect to its sealing surfaces to afford restricted outlet passages for fluid by rotation of said brewing chamber until such perforations and indentations are brought in register with each other.

WALTER C. WEBER.
EDMUND H. WELLECH.